United States Patent [19]

Ergert et al.

[11] Patent Number: 4,626,153

[45] Date of Patent: Dec. 2, 1986

[54] DRAW-KNIFE

[75] Inventors: Karl Ergert; Ernst M. Balzat, both of Frechen, Fed. Rep. of Germany

[73] Assignee: Balzat Werkzeugmaschinenfabrik GmbH, Kerpen-Sindorf, Fed. Rep. of Germany

[21] Appl. No.: 654,120

[22] Filed: Sep. 25, 1984

[30] Foreign Application Priority Data

Sep. 30, 1983 [DE] Fed. Rep. of Germany ....... 3335503

[51] Int. Cl.[4] ............................................... B23D 13/04

[52] U.S. Cl. ....................................... 409/304; 407/71; 409/308; 409/340; 409/345

[58] Field of Search ............... 409/259, 304, 307, 308, 409/339, 340, 342, 345, 346, 348; 407/71, 87, 97

[56] References Cited

U.S. PATENT DOCUMENTS

| | | | |
|---|---|---|---|
| 508,982 | 11/1893 | Rolston | 409/304 X |
| 2,154,576 | 4/1939 | Morton | 409/304 |
| 2,646,727 | 7/1953 | Waldrich | 409/345 |
| 2,744,451 | 5/1956 | Lee | 409/304 X |

OTHER PUBLICATIONS

F 4151/49c Gm (FROMAG, Frondenberg/Ruhr)—Betrifft: *Messerstange mit Messer.*

*Primary Examiner*—Z. R. Bilinsky

*Attorney, Agent, or Firm*—Birch, Stewart, Kolasch & Birch

[57] ABSTRACT

A draw-knife for producing keyways and for profiling workpiece bores comprising a knife bar whose head portion carries a cutting member which comprises two knife plates arranged side by side in the same plane and being coaxially adjustable, and an immobile knife plate provided behind the latter in the drawing direction of the draw-knife. The cutting edge of the immobile knife plate bridges a gap between the inner ends of the cutting edges of the two adjustable knife plates. The length of the cutting front of the cutting member of the draw-knife is changeable thus allowing one sole tool to adapt to any desired width and fit of the desired grooves or profiles.

12 Claims, 8 Drawing Figures

DRAW-KNIFE

BRIEF SUMMARY OF THE INVENTION

The invention relates to a draw-knife for producing keyways and for profiling workpiece bores, in particular for a keyseater, comprising a knife bar having a head portion at which a cutting member with a cutting front directed transversely to the longitudinal axis of the cutting bar is mounted detachably.

For keyseating, the draw-knife is drawn through the workpiece to be worked. The total length of the draw-knife is guided in a knife guide column to avoid its deviation due to the cutting force. During the return travel, the knife bar clamped in a tool holder is lifted by a drag slide while during the working travel the knife bar is pressed against the work. The draw-knives used hitherto are provided with a cutting member having one blade which is mounted detachably but stationarily in the head portion of the knife bar. As a result, width and fit of the desired grooves or of the profile were predetermined so as to be changeable only by regrinding the cutting member. Thus, in practice, it was necessary to use or prepare a specific draw-knife for each desired width and for each fit. Therefore, the expenditure involved with the need of acquiring a plurality of cutting tools, of storing them, of investing time for the interchange of tools etc. has been excessive.

It is the object of the invention to provide a draw-knife of the above mentioned type in which the length of the cutting front is changeable so that one sole tool is adaptable to a considerable range of desired width and fit of grooves or profiles.

The problem is solved in that the cutting member contains two knife plates having cutting edges situated side by side in the same plane and being adjustable coaxially in said plane, a gap intermediate the inner ends of the cutting edges of the two adjustable knife plates being bridged by the cutting edge of a parallel extending immobile knife plate. In the draw direction of the draw-knife, the immobile knife plate may be disposed behind or ahead of the two adjustable knife plates.

Due to the two adjustable knife plates, the width of the cutting front may be changed. With each setting of the two knife plates, the gap between their cutting edges is closed by the cutting edge of the third immobile knife plate thus establishing a groove having a plane bottom and whose width is defined by the lateral overhang of the cutting edges of the adjustable knife plates beyond the cutting edges of the immobile knife plate. Cost of production and purchase of such an adjustable draw-knife are considerably lower than the cost to be incurred for covering with various one-blade draw-knives the possible various cutting front widths and to only an approximate extent. Subject to the selected adjusting member for the adjustable knife plates, the latter may be set independently, in common and synchroneously. Said embodiments allow additional variations for the setting of the cutting front width. If the immobile knife plate is mounted ahead of the two adjustable knife plates, the chip flight or drop is improved with longer drawing lengths in material having a resistance of above 120 kg/mm$^2$.

In an advantageous embodiment of the invention, each adjustable knife plate consists of a rectangular plate body having a cutting edge at the outer end of its longitudinal border, preferably at a raised portion, with the maximum distance between the two knife plates occurring when the inner end of each adjustable knife plate cutting edge abuts gaplessly to the outer end of the cutting edge of the immobile knife plate. Each adjustable knife plate will be less expensive if the cutting edge is provided only on a section of the plate body length, the length of said sections being adapted to the length of the cutting edge of the immobile knife plate which, in any case, has to bridge the largest possible gap between the inner ends of the cutting edges of the adjustable knife plates. The least length of the cutting front occurs when the outer ends of the cutting edges of the adjustable knife plates are adjusted flush with the two outer ends of the cutting edge of the immobile knife plate. In this state, the minimum width of the gap is reached, i.e. said width determines the minimum length of the cutting edge of the immobile knife plate.

On one surface, the immobile knife plate carries a central retaining lug projecting into an interspace between the adjustable knife plates and serving as a counter-element for at least one setting screw which is screwed into the adjustable knife plates. Preferably, use is made of screws of the microtype which permit a very fine setting of the knife plates.

Preferably, the three knife plates are mounted in a throat aperture of the head portion of the knife bar to be clamped there by means of a key piece screwed with the bottom of the throat aperture. The key piece is penetrated by at least one fixed thrust screw whose inner end is supported at the bottom of the throat aperture of the heat portion. Intermediate the key piece and the adjacent knife plate, i.e. the adjustable knife plates or the immobile knife plate, there are inserted spacer and counter-keyplates which improve the tightened seat of the elements. To disassemble the knife plate unit, the screws of the key piece are loosened and the thrust screws are turned into the key piece, which is pressed out of the throat aperture of the head portion thus releasing the knife plate unit. For the assembly of a knife plate unit, the thrust screws must be turned back into the key piece to an extent that they do not interfere with its firm introduction into the gap between an axial end of the throat aperture and the spacer and counter keyplates by means of the fixing screws. If it is intended to change the width of the cutting front the key piece is loosened only enough to allow sliding of the adjustable knife plates by means of the setting screws. Subsequently the key piece is tightened again and the draw-knife is ready for use with another cutting front width.

BRIEF DESCRIPTION OF THE DRAWINGS

Some embodiments of the invention will be explained hereunder with reference to the drawings.

DETAILED DESCRIPTION

Figures 1, 3, 4, 5, 6:
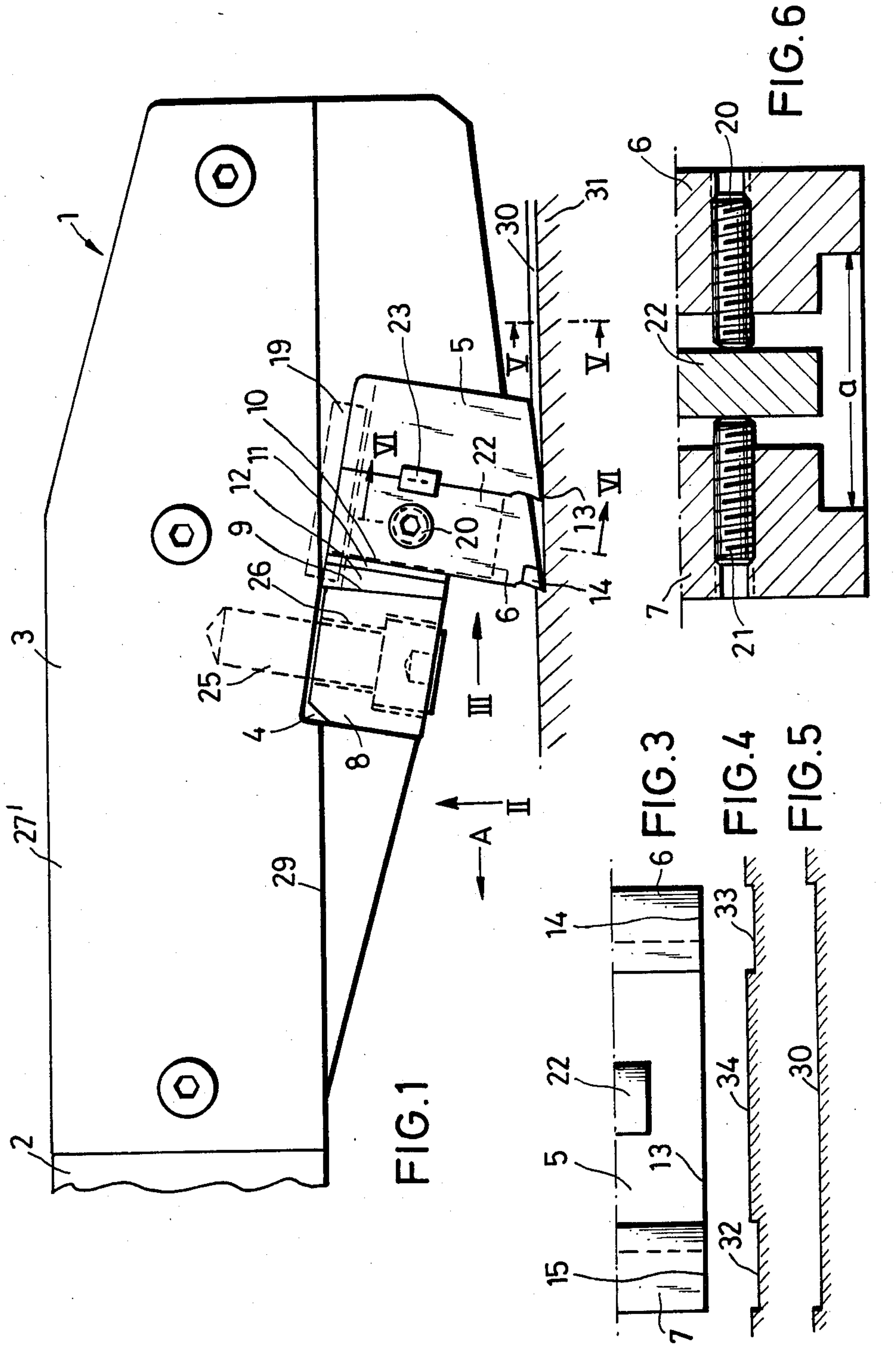
FIG. 1 is a side view of a draw-knife in which the immobile knife plate is provided behind the two adjustable knife plates.
FIG. 3 is a view of the cutting front of the draw-knife of FIG. 1 seen in direction of arrow III.
FIG. 4 is a schematic view of the grooves drawn by the cutting edges of the two adjustable knife plates.
FIG. 5 is a schematic view of the final groove according to line V—V of FIG. 1.
FIG. 6 is a section along line VI—VI in FIG. 1.

A draw-knife 1 for a keyseater comprises a knife bar 2 having a head portion 3 provided with a cutting element.

The underside of the head portion 3 contains a throat opening 4 to receive an immobile knife plate 5, two adjustable knife plates 6 and 7 and a key piece 8. Further, a parallel-faced spacer plate 11 and a counter-key-plate 12 are arranged intermediate the inclined surface 9 of the key piece 8 and the surface 10 of the two knife plates 6,7.

Figure 2:
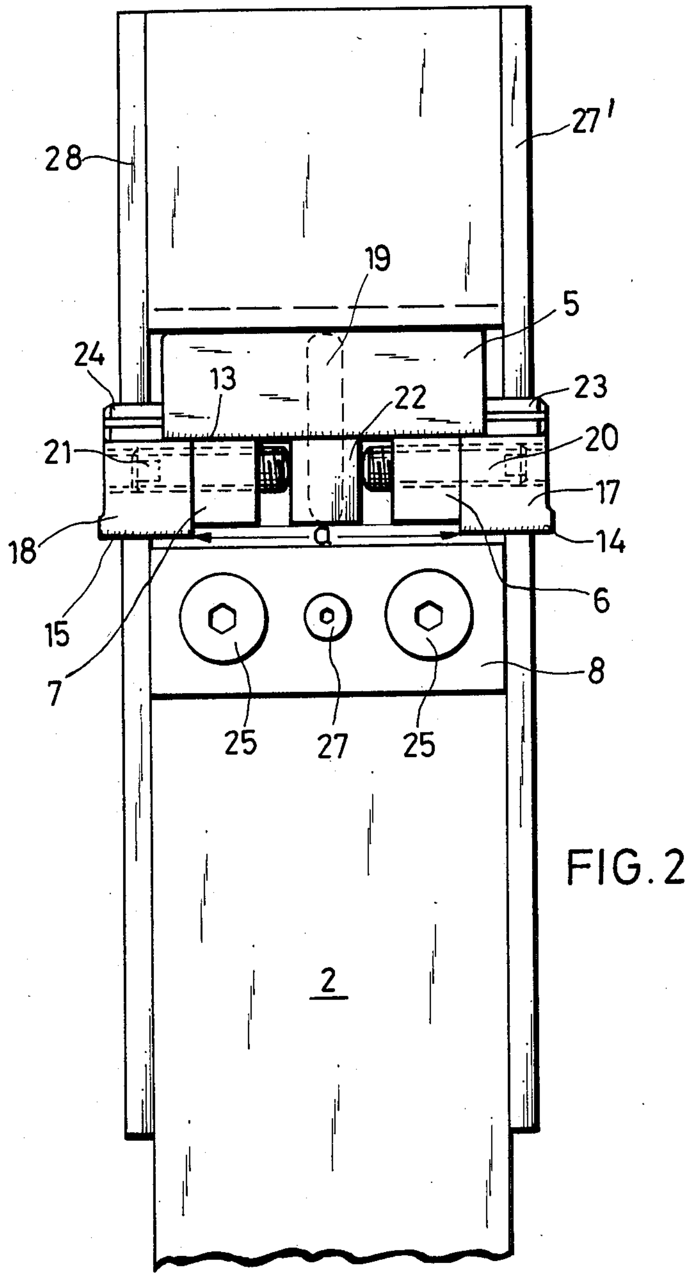
FIG. 2 is a view from below of the draw-knife according to FIG. 1 seen in direction of arrow II.

The immobile knife plate 5 comprises a rectangular plate body having a chamfered edge ending in a cutting edge 13, the two adjustable knife plates 6 and 7 being fitted each with a cutting edge 14 and 15 (FIG. 2) extending in parallel to the cutting edge 13 and being situated ahead of the latter in drawing direction of the drawknife 1. The surfaces of the knife plates 6,7, and 4 are planar, and the rear faces of the adjustable knife plates 6,7 directly adjoin the front surface of the immobile knife plate 5. Since the cutting edges 14 and 15 are mounted only on a raised portion 17,18 at the ends of the plate body of the respective knife plates 6,7, a gap a (see FIG. 2) is left between them which is closed by the continuous cutting edge 13 of the knife plate 5 regardless of the position taken by the two knife plates 6,7 in regard to the knife plate 5.

While the immobile knife plate 5 is secured against lateral shifting by means of a key 19 inserted in the bottom of the throat aperture 4 to extend in direction of the longitudinal axis of the knife bar 2, the two adjustable knife plates 6,7 are displaceable laterally relative to the immobile knife plate 5 and the knife bar 2. Their adjustment is performed by means of setting screws 20, 21, preferably of the microtype whose inner ends are adapted to engage a lug 22 which, in being secured to the front face of the immobile knife plate 5 extends into the interspace intermediate the bodies of the adjustable knife plates 6 and 7 to define the the smallest width of said interspace. Guide wedges 23,24 at the rear face of each adjustable knife plate 6,7 engage grooves in the front face of the immobile knife plate 5 thus ensuring a rectilinear guidance of the two adjustable knife plates 6,7 along the immobile knife plate 5.

By means of the key piece 8, the two adjustable knife plates 6 and 7 are clamped via the spacer plate 11 and the counterkeyplate 12 in the throat opening 4 of the head portion 3. To this effect, there are provided two stable threaded bolts 25 plugged through a bore 26 in the key piece 8 and screwed into a thread bore of the head portion 3. When the screw 25 is tightened, the inclined surface 9 of the key piece 8 exerts the required contact pressure for the clamping of the knife plates 5,6 and 7. To release the knife plate assembly 5,6 and 7, e.g. in view of a proposed setting of the adjustable knife plates 6 and 7, the two threaded bolts 25 are untied to actuate a thrust screw 27 turned into a threaded bore in the key piece 8 and whose lower end is supported at the bottom of the throat aperture 4 of the head portion 3. By turning the thrust screw 27, the key piece 8 is moved to a larger or lesser extent out of the throat aperture 4, and the spacer and counterkeyplates 11,12 may release the adjustable knife plates 6,7 which now may be set accordingly. Subsequently, the thrust screw 27 is turned out of the key piece 8 as much as required, the two threaded bolts 25 are tightened and the knife plate unit 5,6 and 7 are clamped with the desired width of the cutting front.

By means of the adjusted draw-knife 1, it is possible, upon introducing the knife bar 2 in a keyseater, to produce a groove 30 in a workpiece 31 of any desired material. The drawknife 1 is moved in direction of arrow A in FIG. 1. First, the cutting edges 14,15 of the two adjustable knife plates 6,7 are drawing two parallel grooves 32,33 which are separated by a central web 34. The cutting edge 13 of the immobile knife plate 5 bridging the gap a between the cutting edges 14,15 subsequently finishes the web 34 thus forming the groove 30 having a plane bottom and the desired width (FIGS. 4 and 5).

Each side of the head portion 3 is provided with a slide plate 27',28 applied by screws and whose longitudinal edges 29 are adapted to leave open the lateral openings of the throat aperture 4, so that the adjustable knife plates 6,7 may be set without any interference by the slide plates.

Figure 7:
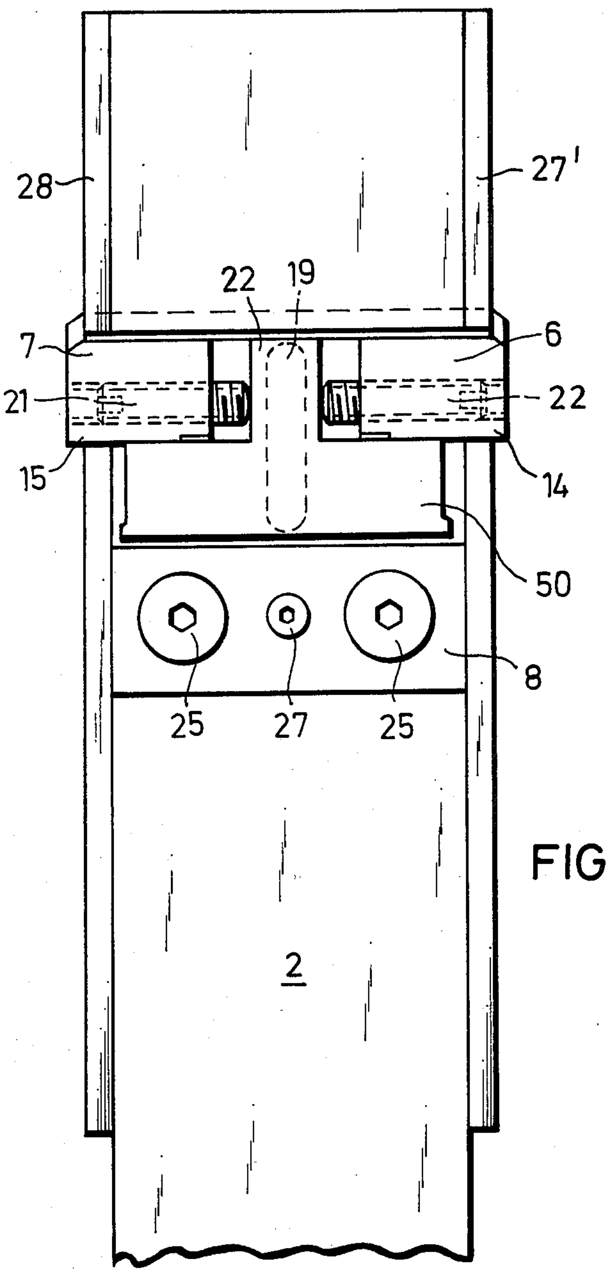
FIG. 7 is a view from below of a second embodiment in which the immobile knife plate is arranged ahead of the two adjustable knife plates and FIG. 8 is a side view of the draw-knife of FIG. 7.
Figure 8:
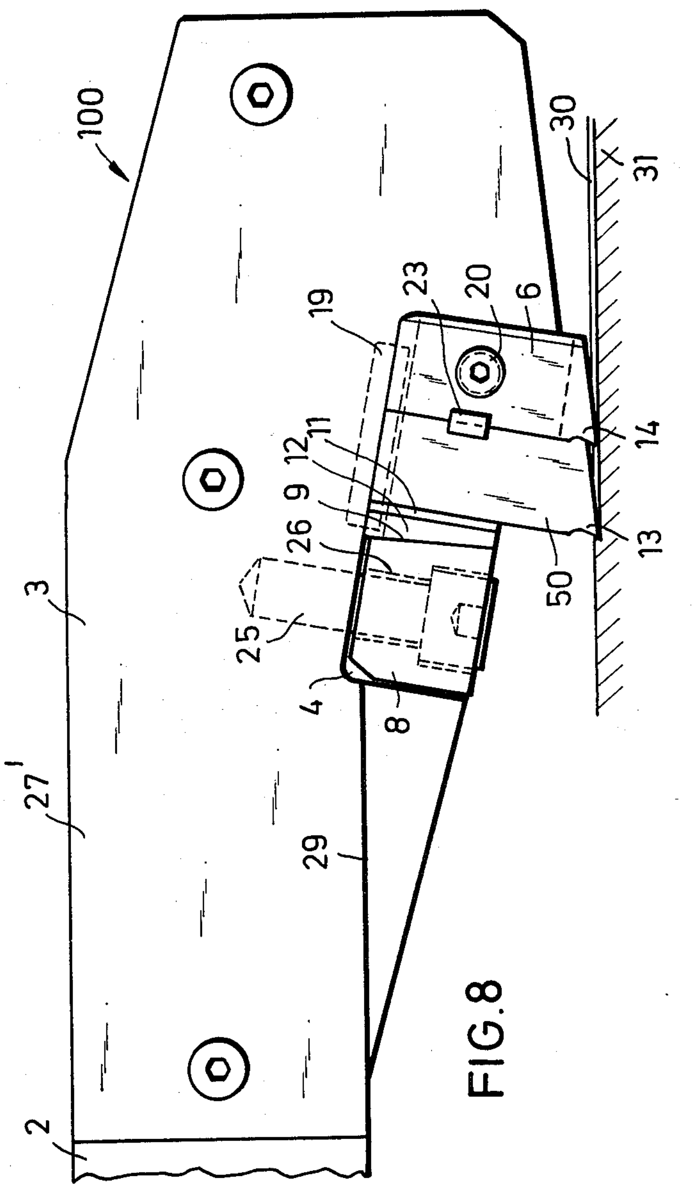

In the draw-knife 100 according to FIGS. 7 and 8, the immobile knife plate 50 is arranged ahead of the two adjustable knife plates 6,7 seen in draw direction of said knife. As for the rest, the arrangement of draw-knife 1 corresponds to that of FIGS. 1 to 6, and the adjustable knife plates 6,7 rest flatly against the parallel immobile knife plate 50 and are displaceable relative thereto.

What is claimed is:

1. Draw-knife for producing keyways and for profiling a workpiece comprising:

- a knife bar having a longitudinal axis;
- a head portion mounted on said knife bar;
- a throat aperture located in said head portion;
- an immobile knife having a cutting edge which extends transversely to the longitudinal axis of said knife bar and located in said throat aperture;
- a pair of coaxially adjustable knife plates located along a transverse axis relative to said longitudinal axis, each having a cutting edge with both adjustable knife plates located in said throat aperture;
- said immobile knife abutting said pair of coaxially adjustable knife plates and located at a different position along said longitudinal axis relative said pair of coaxially adjustable knife plates;
- a clamping means for removably attaching said immobile knife and said pair of coaxially adjustable knife plates located in said throat aperture.

2. The draw-knife according to claim 1, in which said immobile knife plate is positioned behind said air of coaxially adjustable knife plates in the drawing direction along said longitudinal axis.

3. The draw-knife according to claim 1, in which said immobile knife plate is positioned in front of said pair of coaxially adjustable knife plates in the drawing direction along said longitudinal axis.

4. The draw-knife according to claim 1, and further including a pair of adjusting means for repositioning said pair of coaxially adjustable knife plates along their common axis.

5. The draw-knife according to claim 4, in which said immobile knife plate includes a central lug projecting into an interspace between the adjustable knife plates, said central lug is a counter-element for said pair of adjusting means.

6. The draw-knife according to claim 4, in which said clamping element comprises a key piece containing a hole, a screw, a spacer plate and a counter-key plate, said screw passes through the hole in said key piece for retaining said spacer plate, said counter-key plate and said key piece within said throat aperture, said spacer plate and said counter-key plate are inserted intermediate the key piece and the adjacent knife plate.

7. The draw-knife according to claim 4, and further including a key positioned in the bottom of the throat aperture and situated on the longitudinal axis of the knife plate for securing said immobile knife plate.

8. The draw-knife according to claim 4, in which said pair of coaxially adjustable knife plates each have a cutting edge length less than one half the length of the cutting edge of said immobile knife, each cutting edge having an inner and outer end extending in a transverse direction with the cutting edge of said immobile knife, said immobile knife cutting edge having two outer ends, said adjusting means each having an adjustment length at least the length of the cutting edge of one coaxially adjustable knife plate.

9. The draw-knife according to claim 8, in which said immobile knife plate is positioned behind said pair of coaxially adjustable knife plates in the drawing direction along the longitudinal axis.

10. The draw-knife according to claim 8,. in which said immobile knife plate is positioned in front of said pair of coaxially adjustable knife plates in the drawing direction along the longitudinal axis.

11. The draw-knife according to claim 1, in which said coaxially adjustable knife plate consists of a rectangular plate body having at the outer edge of its longitudinal edge a cutting edge, each said cutting edge having an inner end and outer end, said immobile knife cutting edge having two ends, when said coaxially adjustable knife plates are adjusted to a position of maximum mutual distance, the inner end of each cutting edge gaplessly abuts one of the outer ends of the cutting edge of said immobile knife plate.

12. Draw-knife for producing keyways and for profiling a workpiece comprising:

a knife bar having a longitudinal axis;

a head portion mounted on said knife bar;

a throat aperture located in said head portion;

an immobile knife having a cutting edge which extends perpendicular to the longitudinal axis of said knife bar with said cutting edge having two ends in which said immobile knife is positioned within said throat aperture;

a pair of coaxially adjustable knife plates having cutting edges located along an axis perpendicular to said longitudinal axis and parallel to the cutting edge axis of said immobile knife with both adjustable knife plates located in said throat aperture with each cutting edge having an inner and outer end;

said immobile knife abutting said pair of coaxially adjustable knife plates and located at different positions along said longitudinal axis relative said pair of coaxially adjustable knife plates;

a clamping element for removable attaching said immobile knife and said pair of coaxially adjustable knife plates in said throat aperture;

adjusting means for variable positioning of the coaxially adjustable knife plates along their common axis;

said immobile knife cutting edge having a fixed length and said adjusting means having a throw to enable positioning said pair of coaxially adjustable knife plates so that the combined length of their cutting edges plus the distance between their cutting edges is equal to or greater than the length of the immobile knife cutting edge.

* * * * *